United States Patent
Woo et al.

(10) Patent No.: US 10,418,653 B2
(45) Date of Patent: Sep. 17, 2019

(54) FUEL REFORMING DEVICE WITH HEAT STORAGE MEMBER

(71) Applicant: LG ELECTRONICS INC., Seoul (KR)

(72) Inventors: Hyoungsuk Woo, Seoul (KR); Choonjae Ryu, Seoul (KR); Dongkeun Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 167 days.

(21) Appl. No.: 15/711,053

(22) Filed: Sep. 21, 2017

(65) Prior Publication Data
US 2018/0115004 A1  Apr. 26, 2018

(30) Foreign Application Priority Data

Oct. 21, 2016  (KR) .................. 10-2016-0137661

(51) Int. Cl.
| | |
|---|---|
| *H01M 8/0612* | (2016.01) |
| *H01M 8/04701* | (2016.01) |
| *C01B 3/48* | (2006.01) |
| *C01B 3/38* | (2006.01) |
| *B01J 19/24* | (2006.01) |
| *B01J 8/04* | (2006.01) |

(52) U.S. Cl.
CPC ......... *H01M 8/0631* (2013.01); *B01J 8/0465* (2013.01); *B01J 8/0496* (2013.01); *B01J 19/244* (2013.01); *C01B 3/38* (2013.01); *C01B 3/48* (2013.01); *H01M 8/04738* (2013.01); *B01J 2208/00504* (2013.01)

(58) Field of Classification Search
CPC . C01B 2203/0811; C01B 3/384; C01B 3/508; C01B 2203/08; C01B 2203/0816; C01B 2203/0805
See application file for complete search history.

(56) References Cited

U.S. PATENT DOCUMENTS

| | | | | |
|---|---|---|---|---|
| 4,444,727 A | * | 4/1984 | Yanagihara | ............ B01D 53/04 422/223 |
| 2006/0068247 A1 | * | 3/2006 | Kuwata | ............... H01M 8/0618 48/127.9 |
| 2007/0237691 A1 | * | 10/2007 | Takata | ................... B01J 8/0411 422/600 |

FOREIGN PATENT DOCUMENTS

| | | |
|---|---|---|
| JP | 09306533 | 11/1997 |
| JP | 2004066190 | 3/2004 |
| JP | 2006273635 | 10/2006 |
| JP | 2006282424 | 10/2006 |

(Continued)

OTHER PUBLICATIONS

Extended European Search Report in European Application No. 17188385.3, dated Feb. 22, 2018, 6 pages.

(Continued)

*Primary Examiner* — Imran Akram
(74) *Attorney, Agent, or Firm* — Fish & Richardson P.C.

(57) ABSTRACT

A fuel reforming device includes a combustion part including a burner; an exhaust part configured to circulate an exhaust gas that is generated from the combustion part; and a reactor that is configured to generate hydrogen from a raw material by absorbing heat from the exhaust gas circulating in the exhaust part. The reactor includes a heat storage member that is configured to absorb the heat from the exhaust gas during operation of the combustion part, store the absorbed heat, and provide the absorbed heat to the reactor.

19 Claims, 11 Drawing Sheets

(56) References Cited

FOREIGN PATENT DOCUMENTS

| WO | WO2014063191 A1 | 5/2014 |
| WO | WO2013073083 | 4/2015 |

OTHER PUBLICATIONS

Marouka et al., "Development of PCM Reactor for Methane Steam Reforming," ISIJ International, vol. 50 (2010), No. 9, Received on Dec. 4, 2009; accepted on Apr. 30, 2010, pp. 1305-1310.

* cited by examiner

FUEL REFORMING DEVICE WITH HEAT STORAGE MEMBER

CROSS-REFERENCE TO RELATED APPLICATION

Pursuant to 35 U.S.C. § 119(a), this application claims the benefit of an earlier filing date and the right of priority to Korean Patent Application No. 10-2016-0137661, filed on Oct. 21, 2016, the contents of which are incorporated by reference herein in its entirety.

TECHNICAL FIELD

The present disclosure generally relates to a fuel reforming device that generates hydrogen by reforming a hydrocarbon based raw material.

BACKGROUND

A fuel reforming device, commonly known as a steam reforming device, is a type of reformer that generates hydrogen by reforming a raw gas, such as liquefied natural gas (LNG) and liquefied petroleum gas (LPG).

A steam reforming device typically includes a steam reformer, also referred to as a reforming reactor, for generating hydrogen from a raw gas. For example, if the raw gas is LNG having a main component of methane (CH4), then the stream reformer reacts the CH4 with steam to generate hydrogen and carbon dioxide.

However, if carbon monoxide flows into a fuel cell stack, then the stack may be contaminated by carbon monoxide, whereby performance of the stack may be degraded. Therefore, carbon monoxide generated through the steam reformer is often shifted to carbon dioxide by using a shift reactor, such as a high temperature shift reactor (HTS) and a low temperature shift reactor (LTS).

As such, a steam reforming device typically includes a shift reactor, such as a HTS and LTS, for shifting carbon monoxide (CO) generated with hydrogen to carbon dioxide ($CO_2$) to lower concentration of the carbon monoxide.

In addition, some steam reforming devices include a burner for supplying calories. An operation temperature in the steam reformer may be different depending on a type of catalyst that is used. For example, if Ni is used as a catalyst, the operation temperature is generally in the range of 600° C. to 700° C., and this reaction is an endothermic reaction. The calories required for this endothermic reaction are supplied using the burner. An operation temperature in the shift reactor is also different depending on the type of the catalyst, wherein the operation temperature is generally in the range of 300° C. to 420° C. in case of a high temperature shift reactor based on Cu—Zn, and is generally in the range of 235° C. to 300° C. in case of a low temperature shift reactor based on Fe—Cr. This shift reaction is an exothermic reaction and radiates heat during reaction.

SUMMARY

Implementations described herein provide a fuel reforming device that includes a reactor with a heat storage member that stores and transfers heat within the fuel reforming device.

In one aspect, a fuel reforming device includes a combustion part including a burner; an exhaust part configured to circulate an exhaust gas that is generated from the combustion part; and a reactor that is configured to generate hydrogen from a raw material by absorbing heat from the exhaust gas circulating in the exhaust part. The reactor includes a heat storage member that is configured to absorb the heat from the exhaust gas during operation of the combustion part, store the absorbed heat, and provide the absorbed heat to the reactor.

In some implementations, the heat storage member includes: a surface portion; and a phase change portion, constituting a phase change material, inside the surface portion, the phase change portion having a first melting temperature that is lower than a second melting temperature of the surface portion, and having a first latent heat that is higher than a second latent heat of the surface portion.

In some implementations, the surface portion is made of Cu, and the phase change portion is made of an Al alloy.

In some implementations, the fuel reforming device further includes a temperature controller configured to maintain a temperature of the heat storage member.

In some implementations, the temperature controller includes: at least one temperature sensor configured to detect at least one temperature of the reactor, the at least one temperature sensor arranged along a moving direction of the exhaust gas; and at least one processor configured to control an operation of the burner by comparing the at least one temperature detected by the at least one temperature sensor with a melting temperature of the heat storage member.

In some implementations, the at least one processor is further configured to control the burner to maintain a lowest temperature among the at least one temperature detected by the at least one temperature sensor to be higher than the melting temperature of the heat storage member.

In some implementations, the heat storage member includes a plurality of ball-shaped heat-storing members provided in the reactor.

In some implementations, the reactor includes a splitter that defines two or more spaces within the reactor that are separated by the splitter. The heat storage member is arranged at the two or more spaces defined within the reactor.

In some implementations, an inner circumferential portion of the splitter or an outer circumferential portion of the splitter is fixed to an inner circumferential portion or an outer circumferential portion of the reactor.

In some implementations, the splitter includes a plurality of splitters arranged at intervals along a lengthwise direction of the reactor. The plurality of splitters are alternately fixed to the inner circumferential portion and the outer circumferential portion of the reactor in a zigzag pattern.

In some implementations, the splitter is spaced apart from both an inner circumferential portion and an outer circumferential portion of the reactor.

In some implementations, the splitter is arranged along a lengthwise direction between an inner circumferential portion and an outer circumferential portion of the reactor and define an inner circumference space and an outer circumference space in the reactor that are separated by the splitter.

In some implementations, the splitter is provided with a plurality of gas through-holes providing access between the two or more spaces within the reactor that are separated by the splitter.

In some implementations, the splitter is made of a material having a first melting temperature that is higher than a second melting temperature of the heat storage member.

In some implementations, the reactor further includes a catalytic member.

In some implementations, the reactor is arranged adjacent to the combustion part and the exhaustion part and defines a space therebetween, and the heat storage member is provided inside the space.

In another aspect, a fuel reforming device includes: a combustion part including a burner; an exhaust part configured to circulate an exhaust gas that is generated from the combustion part; a reactor that is configured to generate hydrogen from a raw material by absorbing heat from the exhaust gas circulating in the exhaust part; a heat storage member that is provided in the reactor and that is configured to absorb the heat from the exhaust gas during operation of the combustion part, store the absorbed heat, and provide the absorbed heat to the reactor; a plurality of temperature sensors configured to detect a plurality of temperatures of the reactor, the plurality of temperature sensors arranged in the reactor along a moving direction of the exhaust gas; and at least one processor. The at least one processor is configured to control an operation of the burner by comparing the plurality of temperatures detected by the plurality of temperature sensors with a melting temperature of the heat storage member.

In some implementations, the heat storage member includes: a surface portion; and a phase change portion, constituting a phase change material, inside the surface portion, the phase change portion having a first melting temperature that is lower than a second melting temperature of the surface portion, and having a first latent heat that is higher than a second latent heat of the surface portion.

In some implementations, the at least one processor is further configured to: control an input unit to receive information regarding the plurality of temperatures detected by the plurality of temperature sensors; determine whether to operate the burner based on comparing the plurality of temperatures with a threshold temperature; and control an output unit to transmit an operation signal or a stop signal to the burner in accordance with a result of determining whether to operate the burner based on comparing the plurality of temperatures with the threshold temperature.

In some implementations, the at least one processor is further configured to: control the output unit to transmit the operation signal to operate the burner based on a determination that the plurality of temperatures are lower than the threshold temperature; and control the output unit to transmit the stop signal to the output module to maintain a stopped state of the burner based on a determination that the plurality of temperatures are higher than the threshold temperature.

Further scope of applicability of the present disclosure will become more apparent from the detailed description given hereinafter. However, it should be understood that the detailed description and specific examples are given by way of illustration only, and various changes and modifications within the spirit and scope of the disclosure may be made.

DETAILED DESCRIPTION

Figure 1:
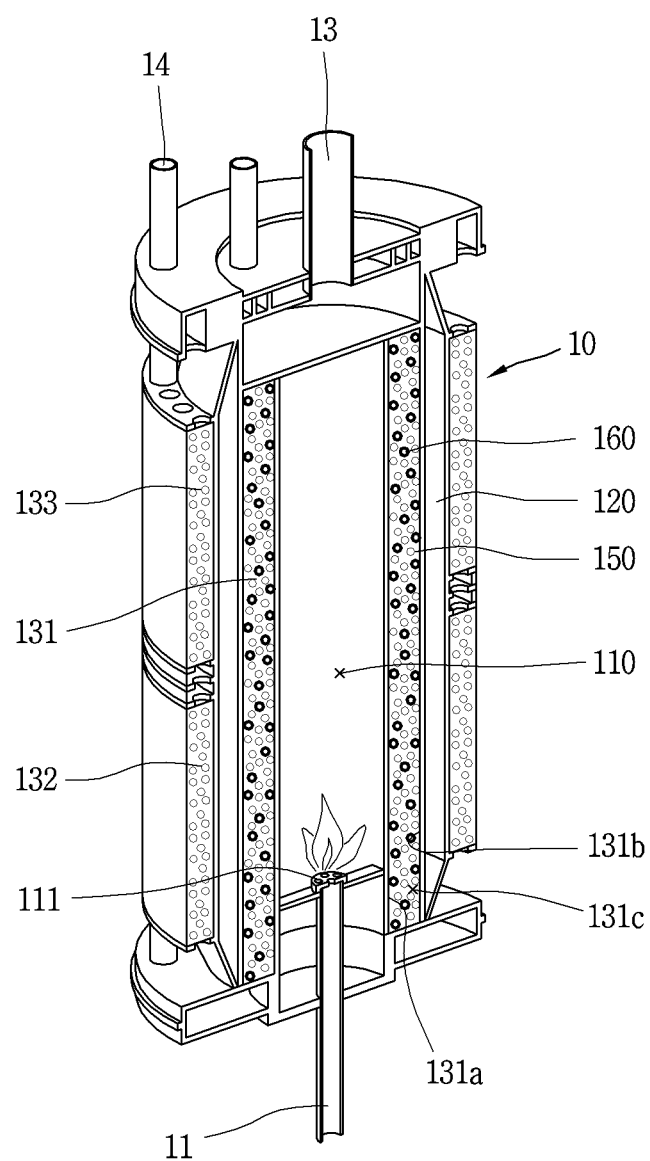
FIG. 1 is a diagram illustrating an example of a section of a fuel reforming device according to one implementation.

Implementations described herein provide a fuel reforming device that includes a reactor with a heat storage member that stores and transfers heat within the fuel reforming device. In some implementations, the heat storage member is configured to absorb heat from an exhaust gas that is generated by a combustion part, store the absorbed heat, and provide the absorbed heat to the reactor.

A fuel processing device may be implemented as a horizontal (or radial) fuel processing device or a longitudinal (or vertical) fuel processing device, depending on an arrangement of a steam reformer and a shift reactor in the device.

In a horizontal fuel processing device, a steam reformer is arranged inside while a shift reactor is arranged outside the device. A combustion chamber provided with a burner is arranged inside the steam reformer, for example, at the innermost of the fuel processing device. In this horizontal fuel processing device, a combustion gas that is generated during combustion supplies heat to the steam reformer by upwardly passing through a path between the steam reformer and the combustion chamber, and then is discharged out. In addition, a raw gas downwardly moves by passing through the steam reformer and then is reformed while upwardly moving by passing through the shift reactor, whereby the raw gas is supplied to a fuel cell stack.

In the aforementioned horizontal fuel processing device, when the steam reformer is re-actuated after being stopped, the stream reformed typically requires a long duration of time to reach an operation temperature, in view of the steam reformer typically being operated at high temperatures. Therefore, in such scenarios, problems may occur in that the steam reformer is not re-actuated quickly and a system operation rate is degraded. Particularly, since a temperature attenuation speed of the steam reforming (SR), which performs an endothermic reaction at a relatively high temperature, is faster than that of the shift reactor after being stopped, much more time is required to reach the operation temperature during re-actuation.

In addition, a temperature of an exhaust gas generated from the burner during combustion is typically reduced after heat exchange, and a problem may arise in that a temperature gradient is increased at the end of the steam reformer and thus results in large reaction deviation per position.

Implementations disclosed herein provide a fuel reforming device that, in some scenarios, may alleviate such difficulties by reducing a time required to reach an operation temperature during re-actuation of a steam reformer, also referred to as a reforming reactor, and thus increase a system operation rate by quickly re-actuating the steam reformer.

In some implementations, the fuel reforming device may increase a reforming effect by lowering a temperature gradient per position of a reactor.

As such, in some scenarios, a reforming reactor of the fuel reforming device may be maintained at a proper temperature even in a state that an operation of the fuel reforming device (or an operation of a fuel cell system that includes the fuel reforming device) is stopped. As a result, the fuel reforming device that includes the reforming reactor may quickly reach the operation temperature by using latent heat of the heat storage member during re-actuation of the fuel reforming device (or the fuel cell system that includes the fuel reforming device).

Also, in some scenarios, implementations disclosed herein may increase hydrogen generation in the fuel reforming device, and may thus improve efficiency of the fuel cell system.

Hereinafter, an example of a fuel reforming device according to one implementation will be described in detail with reference to the accompanying drawings.

Figure 2:
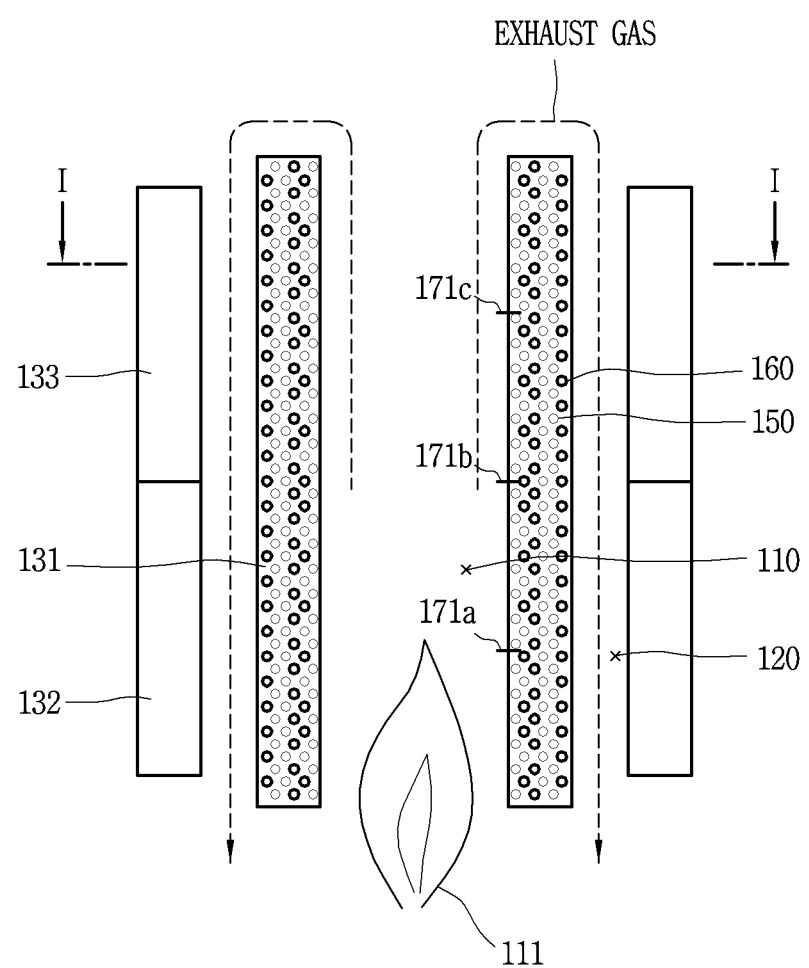
FIG. 2 is a diagram illustrating a longitudinal sectional view of an example of a reforming reactor of a fuel reforming device according to FIG. 1.
Figure 4:
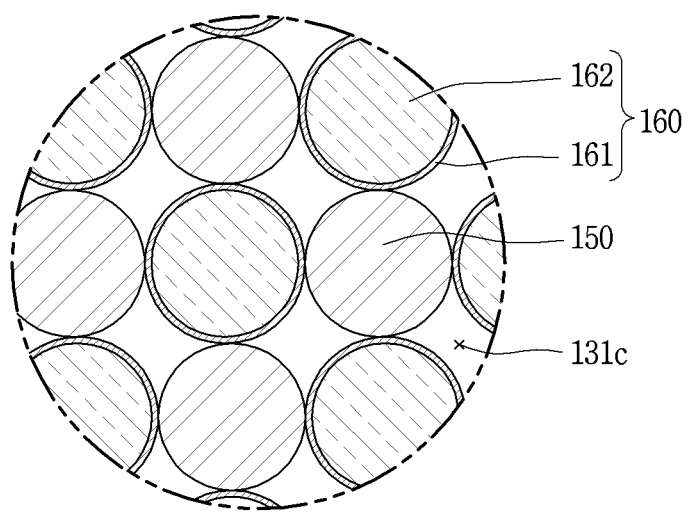
FIG. 4 is a diagram illustrating an enlarged view of a portion "A" of FIG. 3 showing an inner structure of a heat storage member.
Figure 5A:
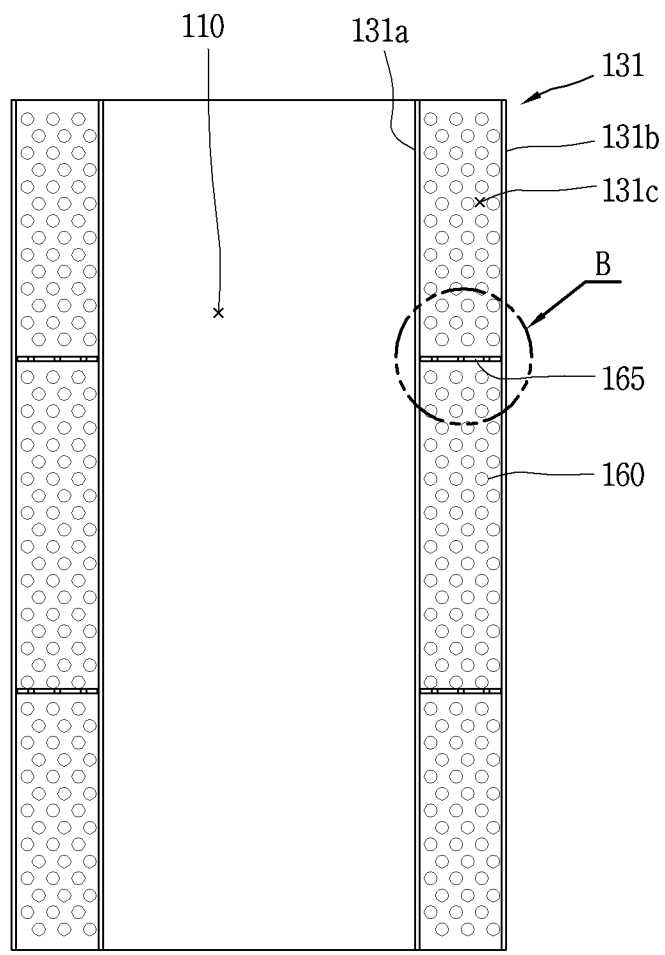
FIG. 5A is a diagram illustrating a sectional view of another example of an inner structure of a reforming reactor according to FIG. 1.
Figure 5B:
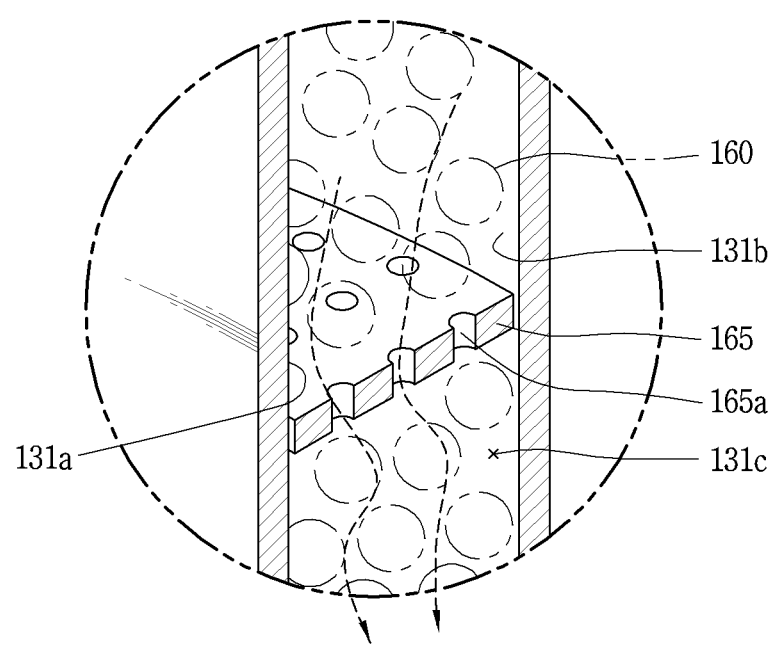
FIG. 5B is a diagram illustrating an enlarged perspective view of an example of a portion "B" of FIG. 5A.

FIG. 1 is a perspective view illustrating a cross-section of a fuel reforming device according to one implementation. FIG. 2 is a longitudinal sectional view illustrating a reforming reactor of a fuel reforming device according to FIG. 1, FIG. 3 is a sectional view taken along line "I-I" of FIG. 2, FIG. 4 is an enlarged view illustrating a portion "A" of FIG. 3 to describe an inner structure of a heat storage member, FIG. 5A is a sectional view illustrating another example of an inner structure of a reforming reactor according to FIG. 1, FIG. 5B is an enlarged perspective view illustrating a portion "B" of FIG. 5A, and FIGS. 6, 7, 8A, and 8B are longitudinal sectional views and horizontal sectional views illustrating examples of a reforming reactor according to some implementations.

Figure 3:
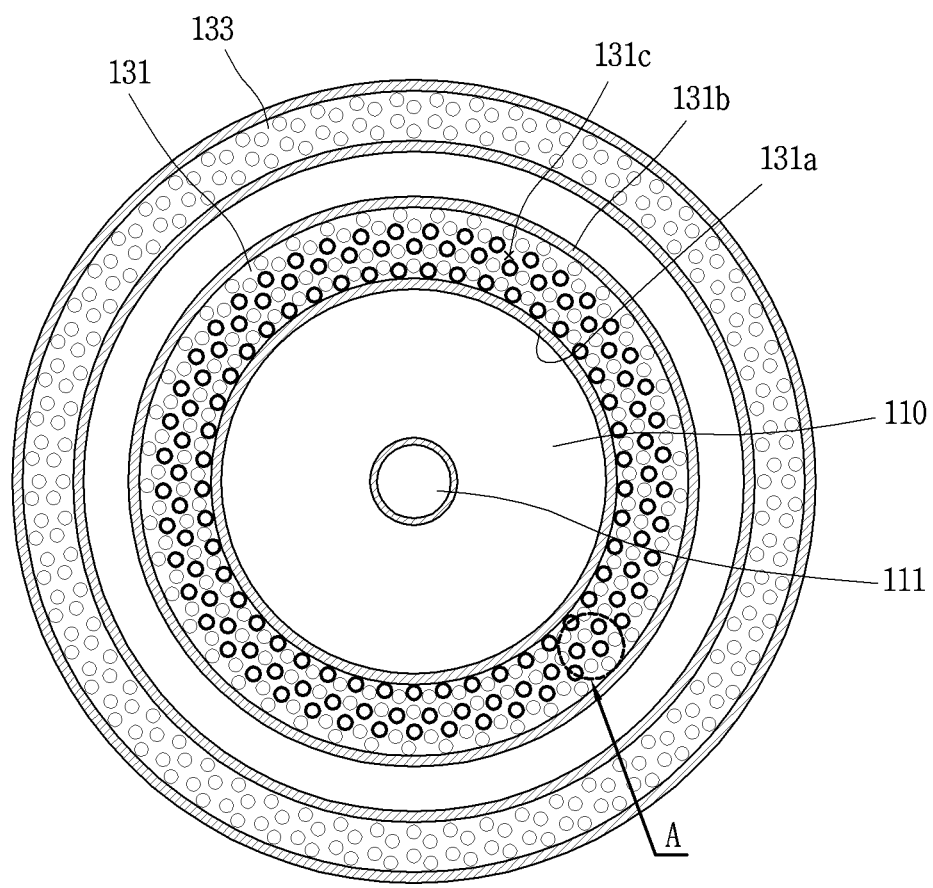
FIG. 3 is a diagram illustrating a sectional view taken along line "I-I" of FIG. 2.

Referring to FIGS. 1 to 3, the fuel reforming device according to the implementation includes a casing 10 longitudinally formed and sealed with an insulation wall therein, a combustion chamber 110 provided along a length direction of the casing 10 at the center inside the casing 10, and a burner 111 provided inside the combustion chamber 110, generating heat by combusting gas. The combustion chamber 110 and the burner 111 constitute a combustion part.

A combustion gas injection inlet 11 may be provided below the casing 10 to inject a gas, which will be combusted by the burner 111, into the combustion chamber 110. A reactant inlet 13 for injecting a reactant toward a reforming reactor 131, which will be described later, may be formed at the top of the casing 10, and a reactant outlet 14 for discharging a reactant out by passing through each of reactors 131, 132 and 133, which will be described later, may be provided at the lower end of the casing 10.

The burner 111 may be installed below the combustion chamber 110. In some implementations, a Bunsen burner which acquires a high temperature by combusting a combustion gas or a metal fiber which uses a combustion gas or the atmospheric air as a fuel may be used as burner 111. In this case, the metal fiber is more efficient than the Bunsen burner in that it may generate a high heat value due to a short flame, and has advantages in that it is easy to control load and has a wide flame range. However, implementations are not limited thereto, and the burner 111 may be any suitable burner for the fuel reforming device.

In the example of FIG. 1, the combustion chamber 110 is arranged at the center of the casing 10, and a reactor portion for generating hydrogen from a raw gas is installed outside the combustion chamber 110. The reactor portion generates $3H_2+CO$ if a catalyst and a high temperature are applied to $CH_4$ and $H_2O$ to generate a chemical reaction. Since CO may cause the atmospheric pollution, CO is shifted to $CO_2$ by a chemical reaction with $H_2O$.

The reactor portion may include a reforming reactor 131 installed inside, which generates hydrogen from a raw gas. The reactor portion may also include shift reactors 132 and 133 installed outside, which shift carbon monoxide that is generated through the reforming reactor 131 into carbon dioxide. For example, in FIG. 1, the reforming reactor 131 and the shift reactors 132 and 133 are formed in a cylindrical shape, whereby the reforming reactor 131 surround the combustion chamber 110, and the shift reactors 132 and 133 surround the reforming reactor 131.

An exhaust path 120 which communicates with the combustion chamber 110 to constitute a discharge path of an exhaust gas generated during combustion may be formed between the reforming reactor 131 and the shift reactors 132 and 133. Therefore, the exhaust gas generated in the combustion chamber 110 may supply heat to the reforming reactor 131 while moving to the top of the casing 10, and may again supply heat to the reforming reactor 131 and the shift reactors 132 and 133 while moving to the lower side of the casing 10 by passing through a space between the reforming reactor 131 and the shift reactors 132 and 133 through the exhaust path 120.

In some implementations, the reforming reactor 131 is formed in a cylindrical shape having a predetermined space 131c between an inner wall 131a and an outer wall.

As shown in FIGS. 1 and 2, the space 131c may be filled with a catalytic material 150 that expedites the reaction of the raw gas. As an example, Ni may be used as the catalytic material 150 in the reforming reactor 131, whereby a reaction temperature of the reforming reactor 131 is in the range of 600° C. to 700° C. Other materials may be used for the catalytic material 150.

In addition to the catalytic material 150, the space 131c may also be filled with a heat storage member 160. The heat storage member 160 may be configured to absorb, store, and transfer heat, thus facilitating transfer and supply of heat from one part of the device to another.

In the examples of FIGS. 1 to 4, the catalytic material 150 and the heat storage member 160 are both implemented in the form of balls that are spherical-shaped balls or approximately spherical-shaped. However, implementations are not limited thereto, and in some implementations, the catalytic material 150 and/or the heat storage member 160 may be formed attached to a plate shaped metal member. For example, as the case may be, the catalytic material 150 may be formed in such a manner that a plurality of catalytic materials are attached to a plate shaped metal member as described above, whereby the catalytic materials may be filled in the space 131c of the reforming reactor 131 by rolling and the heat storage member 160 according to this implementation may be filled between the catalytic materials 150 by loading.

The heat storage member 160 is filled in the space 131c of the reforming reactor 131, and/or shift reactors 132 and 133. The heat storage member 160 absorbs heat from the exhaust gas, stores the heat, and provides the heat to be used for a reforming reaction during re-actuation of the fuel reforming device. In some implementations, the heat storage member 160 may be a phase change material (PCM).

In some implementations, the heat storage member 160 may be formed as a plurality of spherical-shaped balls as described above.

The entirety of the heat storage member 160 may be formed of the same material, or the heat storage member 160 may be formed of multiple materials. In the case of a single material, the heat storage member 160 may be restricted with respect to a peripheral temperature. For example, if the peripheral temperature is higher than a reactor temperature, the heat storage member 160 may not be maintained as its shape during phase change, whereby loss may be generated.

Therefore, it may be preferable in some scenarios that the heat storage member 160 is formed to allow a phase change material to be built in its covering which is able to relatively withstand a high temperature. In such implementations, the heat storage member 160 may be a phase change material (PCM).

For example, as shown in the example of FIG. 4, the heat storage member 160 according to this implementation may include a surface portion 161 forming a covering, and a phase change portion 162 filled in the surface portion 161, forming a type of a phase change material.

The phase change portion 162 may be made of a material having a melting temperature (or phase change temperature) that is lower than that of the surface portion 161, and a latent heat that is higher than that of the surface portion 161.

As an example, the surface portion 161 may be made of a Cu material, or other suitable material having good heat conductivity. In the example of Cu, a phase change temperature (melting temperature) of Cu is 1100° C., approximately, and its latent heat value is 200 (kJ/kg), approximately.

The phase change portion 162 may, as an example, be made of Al Alloy, such as Al—Si, for other suitable material that generates a phase change at a temperature similar to a reforming reaction temperature. In the example of an Al—Si, a phase change temperature of AL-Si is 550° C., and a latent heat value of Al—Si is 200 (kJ/kg), which shows a temperature zone similar to that of the reforming reactor.

In some implementations, if the heat storage member 160 is formed as a plurality of spherical-shaped balls and is filled in the space 131c of the reforming reactor, the heat storage member 160 may be tilted downwardly while moving between the catalytic materials 150. In this case, temperature gradient per position of the reforming reactor 131 is generated, whereby it may be difficult to maintain a uniform reaction temperature.

Considering this, in this implementation as shown in FIG. 5A, a splitter 165 for splitting the heat storage member 160 per layer may be formed at the space 131c of the reforming reactor 131. Although one splitter 165 may be formed at the center of the space 131c, a plurality of splitters may be formed per layer up and down as the case may be.

Also, the plurality of splitters 165 may be formed at the position where heights of the respective layers become equal to one another, but may be formed at the position where heights of the respective layers become different from one another depending on a condition. For example, if the heat storage members 160 are formed to have the same diameter, the splitters 165 may be formed at the position where the heights of the respective layers become equal to one another, to uniformly maintain temperatures of the respective layers. However, if the heat storage members 160 are formed to have different diameters (surface areas), the splitters 165 may be formed in such a manner that a height of a layer where the heat storage member having a relatively great surface area is arranged becomes low, whereas a height of a layer where the heat storage member having a relatively small surface area is arranged become high.

As a result, even though the ball-shaped heat storage members 160 move between the plurality of catalytic members formed in a shape of ball or a shape similar to the ball, the heat storage members 160 may be arranged by being distributed uniformly along a height direction without being tilted downwardly. Therefore, a temperature per position of the reforming reactor 131 may be maintained uniformly, whereby a reforming effect may be improved.

Also, although the splitters 165 may be formed in a shape of plate having no holes to split both layers, in some implementations the splitters 165 may be provided with a plurality of gas through-holes 165a that allow a raw gas to actively pass therethrough as shown in FIG. 5B.

Figure 6:
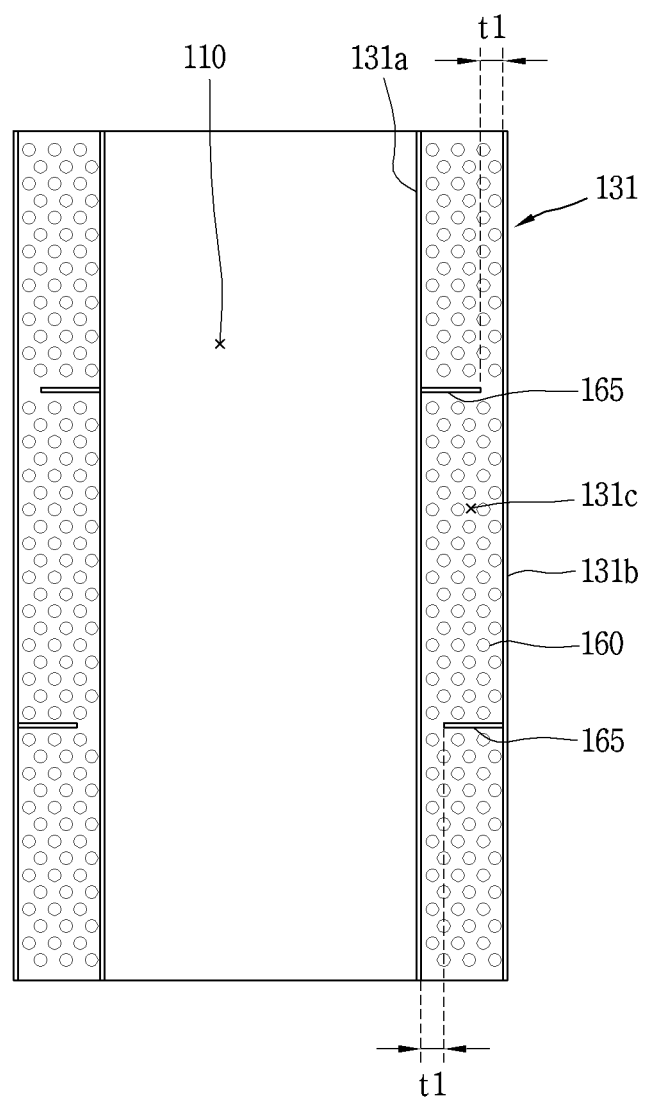
FIGS. 6, 7, 8A, and 8B are diagrams illustrating longitudinal sectional views and horizontal sectional views of examples of a reforming reactor according to some implementations.
Figure 7:
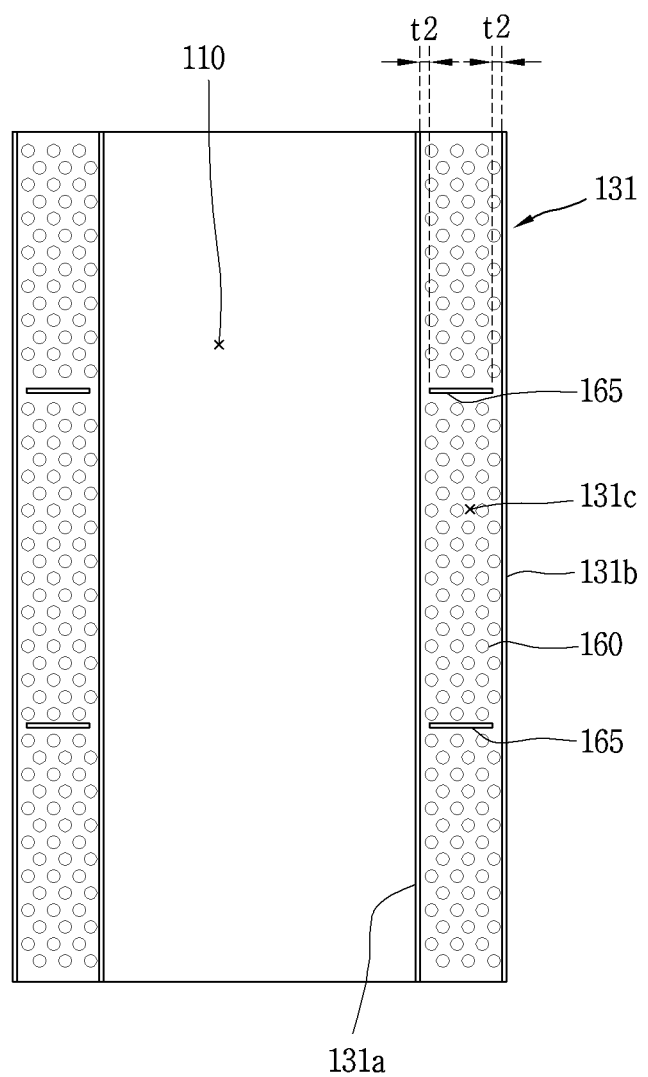

In this case, if the splitters 165 are formed in a shape of plate having no holes, it may be preferable that a width sectional area of the splitter 165 is smaller than that of the reforming reactor 131 to generate a certain interval t1 or t2 between an outer circumferential portion of the inner wall 131a of the reforming reactor 131 and an inner circumferential portion of the splitters 165 or between an inner circumferential portion of the outer wall 131b of the reforming reactor 131 and an outer circumferential portion of the splitters 165, as shown in FIGS. 6 and 7, whereby the raw gas may pass through the splitters 165.

Alternatively, if gas through-holes 165a are formed in the splitters 165 as shown in FIG. 5B, then it may be preferable that the gas through-holes 165a are formed with a size that is as large as possible, within a range that the catalytic members 150 or the heat storage members 160 do not escape through the gas through-holes 165a.

Also, in some implementations, the splitters 165 may be fixed to the inner circumferential portion or the outer circumferential portion of the reforming reactor 131. In this case, it may be preferable that the splitters 165 are fixed to the inner circumferential portion or the outer circumferential portion of the reforming reactor 131 in a zigzag shape as shown in FIG. 6 considering loading of the catalytic members 150 or the heat storage members 160.

In some implementations, as shown in FIG. 7, the splitters 165 may not be fixed to the inner wall 131a or the outer wall 131b of the reforming reactor 131. In this case, the splitters 165 may be arranged at positions that are spaced apart from both the inner wall 131a and outer wall 131b on both sides of the splitters 165. For example, during assembly, the splitters 165 may be inserted into the central area of the reforming reactor 131 at certain intervals during loading of the catalytic members 150 or the heat storage members 160.

Also, although the splitters 165 may be formed in a ring shape to adapt to the shape of the space 131c of the reforming reactor 131, the splitters 165 may be formed in an arc shape as the case may be.

Also, in view of stability, it may be preferable that the splitters 165 are formed of a material having a melting temperature higher than that of the heat storage members 160.

Figure 8A:
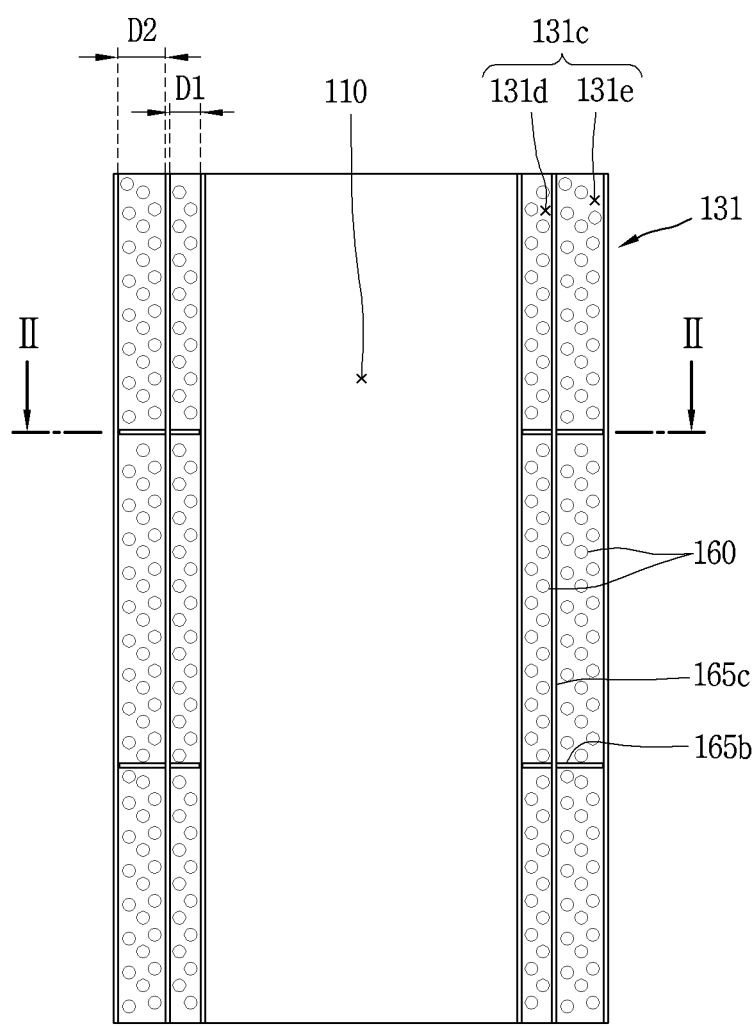

Also, although the splitters 165 may be arranged at certain intervals in a height direction (length direction) of the reforming reactor 131, in addition to horizontal splitters 165b, a vertical splitter 165c may further be provided between the inner wall 131a and the outer wall 131b of the reforming reactor 131 as shown in FIG. 8A, whereby the space 131c may be split into the inner circumferential space and the outer circumferential space in a horizontal direction. If the vertical splitter 165c is provided, although the heat storage members 160 arranged in an inner circumferential space 131d and an outer circumferential space 131e may be loaded at the same specification as much as the same amount, the heat storage members 160 may be loaded in the inner circumferential space 131d and the outer circumferential space 131e at different specifications as much as different amount.

Figure 8B:
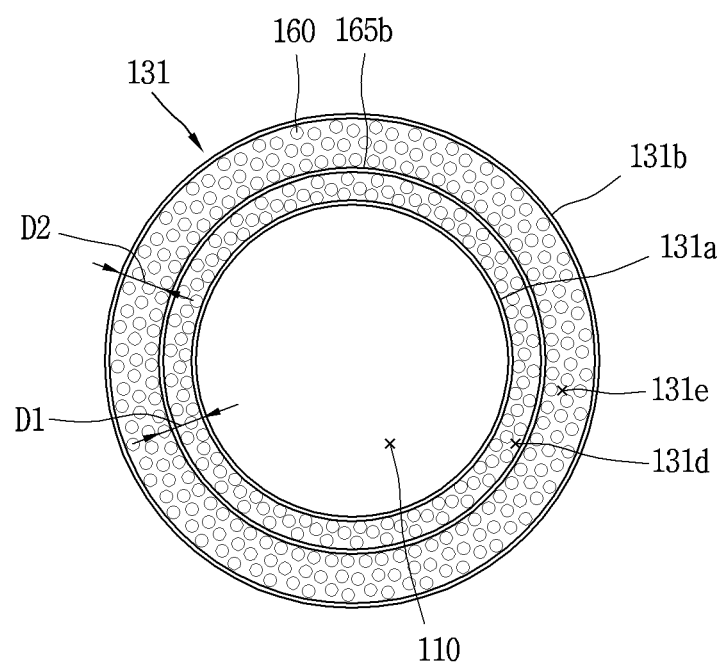

For example, as shown in FIGS. 8A and 8B, a width D1 of the inner circumferential space 131d may be smaller than a width D2 of the outer circumferential space 131e. That is, considering that the exhaust gas first contacts the inner circumferential space 131d, the inner circumferential space 131d may be arranged in such a manner that an entire surface area of the heat storage members 160 arranged in the outer circumferential space 131e is greater than an entire surface area of the heat storage members 160 arranged in the inner circumferential space 131d based on the same circumferential length. As a result, even though the temperature of the outer circumferential space 131e is increased more slowly than the temperature of the inner circumferential space 131d during re-actuation of the reforming reactor 131, since the surface area of the heat storage members 160 arranged in the outer circumferential space 131e is greater than that of the heat storage members 160 arranged in the inner circumferential space 131d, more heat may be supplied from the heat storage member 160 to the outer circumferential space 131e, whereby the outer circumferential space 131e may reach an operation temperature similarly to the inner circumferential space 131d.

Figure 9:
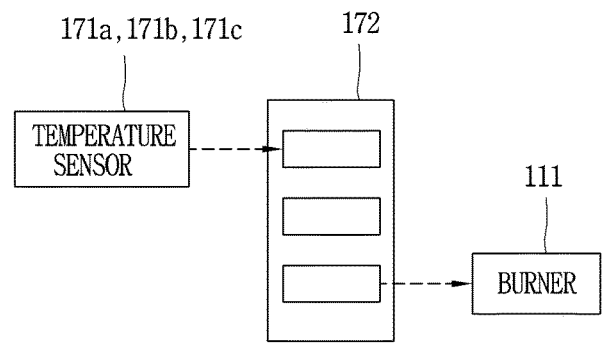
FIG. 9 is a block diagram illustrating an example of a temperature controller of the fuel reforming device according to some implementations.
Figure 10:
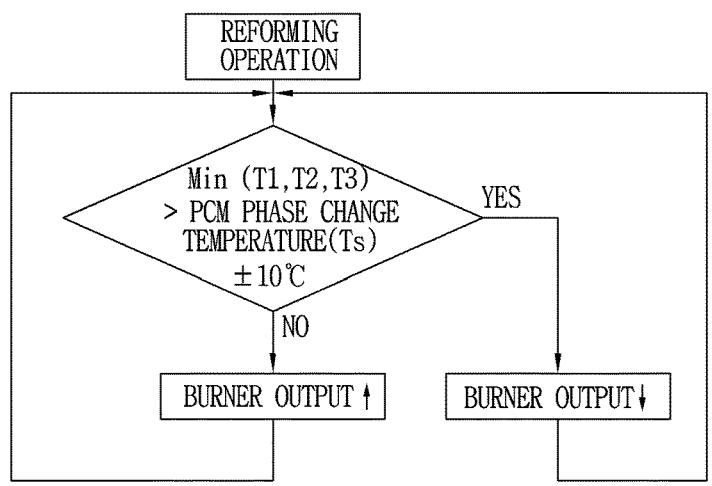
FIG. 10 is a flowchart illustrating an example of a heat storage process in a fuel reforming device according to some implementations.

In some implementations, a temperature controller may be configured to control an appropriate supply of heat for a phase change of the heat storage members 160. According to implementations described herein, such supply of heat may utilize latent heat of the heat storage members 160. FIGS. 9 and 10 are diagrams illustrating examples of a heat storage process in a fuel reforming device according to some implementations.

For example, the temperature controller according to this implementation may include temperature sensors 171a to 171c for detecting a temperature of the reforming reactor 131, and at least one processor, such as controller 172, for controlling an operation of the burner 111 by comparing the temperature detected from the temperature sensors 171a to 171c with a set temperature, as shown in FIGS. 2 and 9.

A plurality of the temperature sensors 171a to 171c may be arranged on the inner circumferential portion or the outer circumferential portion of the reforming reactor 131 in a length direction (up and down) at proper intervals along a moving direction of the exhaust gas. For reference, in FIG. 2, the temperature sensors 171a to 171c are arranged on the inner circumferential portion of the reforming reactor 131 at three stages.

The controller 172 may include an input module 172a electrically connected with the plurality of temperature, receiving detection temperatures from the temperature sensors 171a to 171c, a determination module 172b determining whether to operate the burner 111 by comparing the detection temperatures T1, T2 and T3 input to the input module 172a with a set temperature Ts, and an output module 172c transmitting an operation signal or a stop signal to the burner 111 in accordance with the result determined by the determination module 172b.

The determination module 172b may transmit the operation signal to the output module 172c to operate the burner 111 if the detection temperatures T1, T2 and T3 are lower than the set temperature Ts, whereas the determination module 172b may transmit the stop signal to the output module 172c to maintain a stopped state of the burner 111 if the detection temperatures T1, T2 and T3 are higher than the set temperature Ts.

In this case, a specific temperature, that is, a phase change temperature of the phase change portion 162 may be defined as the set temperature Ts, or a temperature greater than or smaller than the phase change temperature within a certain range may be defined as the set temperature Ts. Also, a temperature obtained by adding or subtracting a specific temperature to or from the phase change temperature may be defined as the set temperature Ts.

Also, if the plurality of temperature sensors 171a to 171c are provided, that is, the plurality of detection temperatures T1 to T3 are provided, a temperature detected from any one of the temperature sensors may be defined as the detection temperature or an average temperature of temperatures detected from the plurality of temperature sensors may be defined as the detection temperature.

For example, if the three temperature sensors 171a to 171c are provided at a lower stage, a middle stage and an upper stage of the reforming reactor, the temperature sensors 171a to 171c of the respective stages detect a temperature of the reforming reactor 131 per stage, and the lowest detection temperature of the temperature sensors 171a to 171c may be compared with the set temperature to determine whether the burner should be operated.

In this case, the set temperature Ts may be a temperature obtained by adding a tolerance temperature (e.g., 10° C. in the example of FIG. 10) to the phase change temperature of the heat storage member 160. Therefore, the detection temperatures T1 to T3 are compared with the set temperature Ts, and as a result, if the detection temperature is higher than the set temperature, it is determined that latent heat through phase change of the heat storage member 160 may be used even by the current temperature of the reforming reactor, whereby the burner 111 may be maintained at a stopped state or its heating power may be lowered. On the other hand, if the detection temperature is lower than the set temperature, since the current heat storage member 160 cannot use latent heat, the burner 111 may be operated or its heating power may be enhanced, whereby the phase change portion of the heat storage member 160 may generate phase change.

In the aforementioned implementation, after the temperature of the reforming reactor is detected in real time using the temperature sensor, it is determined whether to operate the burner in accordance with the detected result. However, in another implementation, the burner may be operated per fixed time using a timer without a separate temperature sensor, whereby the heat storage member may maintain a phase change temperature.

Therefore, the reforming reactor may be maintained at a proper temperature even in a state that the operation of the fuel reforming device or the fuel cell system that includes the fuel reforming device is stopped. As a result, the fuel reforming device that includes the reforming reactor may quickly reach the operation temperature by using latent heat of the heat storage member during re-actuation of the fuel reforming device or the fuel cell system that includes the fuel reforming device. In this case, the possibility of hydrogen generation in the fuel reforming device may be increased, whereby efficiency of the fuel cell system may be increased.

The foregoing implementations and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary implementations described herein may be combined in various ways to obtain additional and/or alternative exemplary implementations.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any appropriate kind of digital computer. Generally, a processor will receive instructions and data from a read only memory or a random access memory or both.

Implementations described herein may be implemented as code that can be written to a computer-readable recording medium and can thus be read by at least one processor. The computer-readable recording medium may be any type of recording device in which data can be stored in a computer-readable manner. Examples of the computer-readable recording medium include a HDD (Hard Disc Drive), a SSD (Solid State Disc), SDD (Silicon Disc Drive), a ROM, a RAM, a CD-ROM, a magnetic tape, a floppy disk, optical data storage, and a carrier wave, e.g., data transmission over the Internet. The at least one processor may include the controller 172, input module 172a, determination module 172b, output module 172c, or temperature sensors 171a to 171c. The input module 172a and output module 172c may include appropriate hardware, circuitry, and/or processors that transmit and receive signals through a communication medium, such as wired communications or over-the-air communications.

As the present features may be implemented in several forms without departing from the characteristics thereof, it should also be understood that the above-described implementations are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A fuel reforming device comprising:
a combustion part comprising a burner;
an exhaust part configured to circulate an exhaust gas that is generated from the combustion part; and
a reactor that is configured to generate hydrogen from a raw material by absorbing heat from the exhaust gas circulating in the exhaust part,
wherein the reactor comprises a heat storage member that is configured to absorb the heat from the exhaust gas during operation of the combustion part, store the absorbed heat, and provide the absorbed heat to the reactor,
wherein the heat storage member includes a surface portion that is made of Cu, and a phase change portion that is made from an Al alloy.

2. The fuel reforming device of claim 1, wherein the phase change portion has a first melting temperature that is lower than a second melting temperature of the surface portion and a first latent heat that is higher than a second latent heat of the surface portion.

3. The fuel reforming device of claim 1, further comprising a temperature controller configured to maintain a temperature of the heat storage member.

4. The fuel reforming device of claim 3, wherein the temperature controller comprises:
at least one temperature sensor configured to detect at least one temperature of the reactor, the at least one temperature sensor arranged along a moving direction of the exhaust gas; and
at least one processor configured to control an operation of the burner by comparing the at least one temperature detected by the at least one temperature sensor with a melting temperature of the heat storage member.

5. The fuel reforming device of claim 4, wherein the at least one processor is further configured to control the burner to maintain a lowest temperature among the at least one temperature detected by the at least one temperature sensor to be higher than the melting temperature of the heat storage member.

6. The fuel reforming device of claim 1, wherein the heat storage member comprises a plurality of ball-shaped heat-storing members provided in the reactor.

7. The fuel reforming device of claim 6, wherein the reactor comprises a splitter that defines two or more spaces within the reactor that are separated by the splitter, and
wherein the heat storage member is arranged at the two or more spaces defined within the reactor.

8. The fuel reforming device of claim 7, wherein an inner circumferential portion of the splitter or an outer circumferential portion of the splitter is fixed to an inner circumferential portion or an outer circumferential portion of the reactor.

9. The fuel reforming device of claim 8, wherein the splitter comprises a plurality of splitters arranged at intervals along a lengthwise direction of the reactor,
wherein the plurality of splitters are alternately fixed to the inner circumferential portion and the outer circumferential portion of the reactor in a zigzag pattern.

10. The fuel reforming device of claim 7, wherein the splitter is spaced apart from both an inner circumferential portion and an outer circumferential portion of the reactor.

11. The fuel reforming device of claim 7, wherein the splitter is arranged along a lengthwise direction between an inner circumferential portion and an outer circumferential portion of the reactor and define an inner circumference space and an outer circumference space in the reactor that are separated by the splitter.

12. The fuel reforming device of claim 7, wherein the splitter is provided with a plurality of gas through-holes providing access between the two or more spaces within the reactor that are separated by the splitter.

13. The fuel reforming device of claim 7, wherein the splitter is made of a material having a first melting temperature that is higher than a second melting temperature of the heat storage member.

14. The fuel reforming device of claim 1, wherein the reactor further comprises a catalytic member.

15. The fuel reforming device of claim 1, wherein the reactor is arranged adjacent to the combustion part and the exhaustion part and defines a space therebetween, and the heat storage member is provided inside the space.

16. A fuel reforming device comprising:
a combustion part comprising a burner;
an exhaust part configured to circulate an exhaust gas that is generated from the combustion part;

a reactor that is configured to generate hydrogen from a raw material by absorbing heat from the exhaust gas circulating in the exhaust part;
a heat storage member that is provided in the reactor and that is configured to absorb the heat from the exhaust gas during operation of the combustion part, store the absorbed heat, and provide the absorbed heat to the reactor, wherein the heat storage member includes a surface portion that is made of Cu, and a phase change portion that is made from an Al alloy;
a plurality of temperature sensors configured to detect a plurality of temperatures of the reactor, the plurality of temperature sensors arranged in the reactor along a moving direction of the exhaust gas; and
at least one processor configured to control an operation of the burner by comparing the plurality of temperatures detected by the plurality of temperature sensors with a melting temperature of the heat storage member.

17. The fuel reforming device of claim 16, wherein the phase change portion has a first melting temperature that is lower than a second melting temperature of the surface portion and a first latent heat that is higher than a second latent heat of the surface portion.

18. The fuel reforming device of claim 17, wherein the at least one processor is further configured to:
control an input unit to receive information regarding the plurality of temperatures detected by the plurality of temperature sensors;
determine whether to operate the burner based on comparing the plurality of temperatures with a threshold temperature; and
control an output unit to transmit an operation signal or a stop signal to the burner in accordance with a result of determining whether to operate the burner based on comparing the plurality of temperatures with the threshold temperature.

19. The fuel reforming device of claim 18, wherein the at least one processor is further configured to:
control the output unit to transmit the operation signal to operate the burner based on a determination that the plurality of temperatures are lower than the threshold temperature; and
control the output unit to transmit the stop signal to maintain a stopped state of the burner based on a determination that the plurality of temperatures are higher than the threshold temperature.

* * * * *